(12) United States Patent
Lee et al.

(10) Patent No.: US 12,109,729 B2
(45) Date of Patent: Oct. 8, 2024

(54) WIRE SAW HAVING DUST COLLECTING APPARATUS

(71) Applicant: EGUN CO., LTD., Gwangju-si (KR)

(72) Inventors: Sung Jun Lee, Gwangju-si (KR); Chae Mun Lee, Seongnam-si (KR)

(73) Assignee: EGUN CO., LTD., Gwangju-si (KR)

( * ) Notice: Subject to any disclaimer, the term of this patent is extended or adjusted under 35 U.S.C. 154(b) by 323 days.

(21) Appl. No.: 17/779,498

(22) PCT Filed: Nov. 24, 2020

(86) PCT No.: PCT/KR2020/016651
§ 371 (c)(1),
(2) Date: May 24, 2022

(87) PCT Pub. No.: WO2021/107546
PCT Pub. Date: Jun. 3, 2021

(65) Prior Publication Data
US 2022/0410434 A1 Dec. 29, 2022

(30) Foreign Application Priority Data

Nov. 26, 2019 (KR) .................. 10-2019-0153083
Mar. 4, 2020 (KR) .................. 10-2020-0026897

(51) Int. Cl.
*B28D 7/02* (2006.01)
*B23D 57/00* (2006.01)
(Continued)

(52) U.S. Cl.
CPC .......... *B28D 7/02* (2013.01); *B23D 57/0007* (2013.01); *B23D 57/0061* (2013.01);
(Continued)

(58) Field of Classification Search
CPC ...... B28D 5/045; B28D 5/042; B28D 5/0076; B28D 5/07; B28D 1/124; B28D 1/08;
(Continued)

(56) References Cited

U.S. PATENT DOCUMENTS 6,041,766 A * 3/2000 Vojtechovsky ........ B28D 5/045
125/16.02
6,261,166 B1 * 7/2001 Asakawa ............. B28D 5/0076
125/16.02
(Continued)

FOREIGN PATENT DOCUMENTS

JP H10-175207 A 6/1998
JP 2002-283208 A 10/2002
(Continued)

OTHER PUBLICATIONS

KR-100561715-B1 English Translation (Year: 2006).*

*Primary Examiner* — Makena S Markman
(74) *Attorney, Agent, or Firm* — Rabin & Berdo, P.C.

(57) ABSTRACT

This wire saw machine having a dust collecting apparatus comprises a main roller for moving a wire by rotation; a first pulley system including a first upper dust collecting roller, a first lower dust collecting roller, and a first support roller; a second pulley system including a second upper dust collecting roller, a second lower dust collecting roller, and a second
(Continued)

support roller; and a dust collecting unit which is provided under the first pulley system and the second pulley system to collect foreign substances that escape from the first pulley system and the second pulley system.

6 Claims, 7 Drawing Sheets (51) Int. Cl.
 *B23D 59/00* (2006.01)
 *B23D 61/18* (2006.01)
 *B24B 27/06* (2006.01)
 *B28D 1/08* (2006.01)
 *B28D 5/00* (2006.01)
 *B28D 5/04* (2006.01)
 *B24B 55/02* (2006.01)
(52) U.S. Cl.
 CPC ......... *B23D 59/006* (2013.01); *B23D 61/185* (2013.01); *B28D 1/08* (2013.01); *B28D 5/0076* (2013.01); *B28D 5/042* (2013.01); *B28D 5/045* (2013.01); *B24B 27/0633* (2013.01); *B24B 55/02* (2013.01)

(58) Field of Classification Search
 CPC ........ B28D 7/02; B23D 61/185; B23D 61/18; B23D 57/0007; B23D 57/0053; B23D 57/0061; B23D 57/0069; B23D 57/003; B23D 59/006; B24B 27/0633; B24B 55/02
 USPC .......... 125/14, 21; 451/311; 83/651.1, 200.1
 See application file for complete search history.

(56) References Cited

U.S. PATENT DOCUMENTS 8,744,302 B2    6/2014  Matsushita et al.
2004/0231654 A1* 11/2004  Parsells .............. B23D 57/0007
                                                     125/21

FOREIGN PATENT DOCUMENTS

| | | |
|---|---|---|
| JP | 2013-113994 A | 6/2013 |
| KR | 100561715 B1 * | 3/2006 |
| KR | 10-0806573 B1 | 2/2008 |
| KR | 10-1337274 B1 | 12/2013 |

* cited by examiner

WIRE SAW HAVING DUST COLLECTING APPARATUS

TECHNICAL FIELD

The present invention relates to a wire saw, and more particularly to a wire saw having a dust collector.

BACKGROUND ART

In general, a structure made of concrete may be cut by a cutting device using a diamond wire. A cutting wire configured to cut a concrete structure or rock is easily contaminated by various kinds of foreign matter, such as dust, water, or sludge, during a cutting process. In order to neatly cut the concrete structure, therefore, it is necessary to remove foreign matter present on the surface of the wire.

However, an apparatus capable of remove foreign matter attached to the surface of the cutting wire has not yet been proposed. In addition, it is not easy for a user to manually remove foreign matter from the surface of a long wire. Therefore, there is a necessity for a wire saw having a dust collector capable of more effectively removing foreign matter, such as dust, attached to the surface of a diamond wire, etc.

DISCLOSURE

Technical Problem

It is an object of the present invention to provide a wire saw (wire saw machine) having a dust collector.

Objects of the present invention devised to solve the problems are not limited to the aforementioned object, and other unmentioned objects will be clearly understood by those skilled in the art based on the following detailed description of the present invention.

Technical Solution

A wire saw having a dust collector according to the present invention includes to accomplish the above object includes a main roller configured to move a wire through rotation thereof, a first pulley system including a first upper dust collection roller, a first lower dust collection roller, and a first support roller, a second pulley system including a second upper dust collection roller, a second lower dust collection roller, and a second support roller, and a dust collection unit provided under the first pulley system and the second pulley system, the dust collection unit being configured to collect foreign matter separated from the first pulley system and the second pulley system, wherein the plurality of rollers is connected to the wire such that the wire passes through the first pulley system and is moved to the second pulley system via the main roller, wherein, in the first pulley system, the first upper dust collection roller is disposed higher than the first lower dust collection roller, and the first upper dust collection roller and the first lower dust collection roller are disposed so as to be inclined relative to a plane perpendicular to the ground, wherein the second pulley system is disposed lower than the first pulley system, and wherein the second upper dust collection roller is disposed higher than the second lower dust collection roller, and the second upper dust collection roller and the second lower dust collection roller are disposed so as to be inclined relative to a plane perpendicular to the ground.

The wire saw may further include a lower inclined surface disposed under the main roller, wherein the lower inclined surface may be connected to the dust collection unit. The wire saw may further include a nozzle configured to inject water or liquid in a direction perpendicular to the main roller.

In the wire saw, the angle between an inclined surface formed by the first upper dust collection roller and the first lower dust collection roller and the plane perpendicular to the ground may be 10 degrees to 30 degrees.

The dust collection unit may include a collection portion configured to collect the foreign matter and a discharge port configured to discharge the foreign matter to the outside.

The wire saw may further include a protective frame configured to protect the interior of the wire saw, wherein the protective frame may include a transparent window.

The wire saw may further include a third support roller disposed between the first pulley system and the main roller, the third support roller being configured to support the wire so as to be movable from the first pulley system to the main roller, wherein the third support roller may be provided in plural.

Advantageous Effects

The present invention described above has the following various effects.

The present invention has an effect in that a cutting wire is moved around outer circumferential surfaces of a plurality of dust collection rollers of a pulley system, whereby foreign matter present on the surface of the wire is easily removed by centrifugal force generated on the outer circumferential surface of each of the dust collection rollers due to rotation thereof using relatively small energy.

The present invention has an effect in that a wire saw includes a first pulley system and a second pulley system, wherein foreign matter is primarily removed from the wire while the wire passes through the first pulley system, and foreign matter is secondarily removed from the wire while the wire passes through the second pulley system, whereby completeness in removal of foreign matter from the wire is improved.

The present invention has an effect in that a lower surface of an inner space of a wire saw having a dust collector is inclined, whereby foreign matter may be moved from the lower surface to a dust collection unit while sliding, and therefore it is possible to solve a problem in that foreign matter, such as dust, remains in the inner space of the wire saw having the dust collector.

A dust collection unit (dust collector) is provided, whereby foreign matter, such as dust, generated on the surface of a (cutting) wire after the wire cuts a structure made of concrete is effectively collected and discharged, and therefore it is possible to easily remove the foreign matter.

Effects obtainable from the present invention are not limited by the above mentioned effects, and other unmentioned effects can be clearly understood from the following description by those having ordinary skill in the technical field to which the present invention pertains.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The following detailed description of the present invention will be given with reference to the accompanying drawings showing specific embodiments, based on which the present invention can be implemented, by way of example. These embodiments will be described in detail to such an extent that those skilled in the art can implement the present invention. It should be understood that various embodiments of the present invention are different from each other but do not have to be mutually exclusive. For example, specific shapes, structures, and features of one embodiment described herein can be implemented as another embodiment without departing the spirit and scope of the present invention. In addition, it should be understood that the position or disposition of individual elements in each disclosed embodiment can be changed without departing from the spirit and scope of the present invention. Consequently, the following detailed description is not restrictive, and the scope of the present invention is defined only by the appended claims and all equivalents thereto, if appropriately described. In the drawings, similar reference numerals denote the same or similar functions in several aspects.

In some cases, in order to avoid ambiguity in the concept of the present invention, known structures and devices may be omitted, or a core function of each structure and device may be shown as a block diagram. In addition, the same elements are denoted by the same reference numerals throughout this specification.

In interpreting an element, it is to be interpreted that an error range is included unless the context clearly indicates otherwise.

When a positional relationship is described, for example, when the positional relationship between two parts is described using terms such as "on", "above," "under," "beside," etc., one or more additional parts may be located between the two parts unless the term "immediately" or "directly" is used.

Hereinafter, preferred embodiments of the present invention will be described in detail with reference to the accompanying drawings such that those skilled in the art to which the present invention pertains can easily implement the present invention.

Features of various embodiments of the present invention may be partially or entirely coupled to or combined with each other, and may be technically interlocked and driven in various manners. Various embodiments may be realized independently or in combination with each other.

Figure 1:
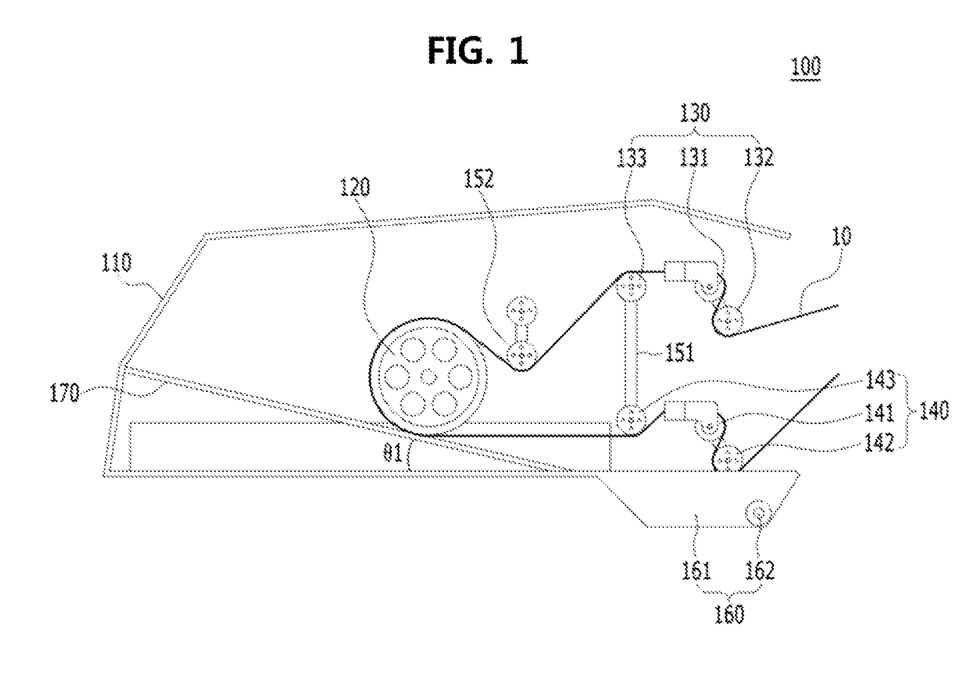
FIG. 1 is a side view of a wire saw having a dust collector according to an embodiment of the present invention.
Figure 2:
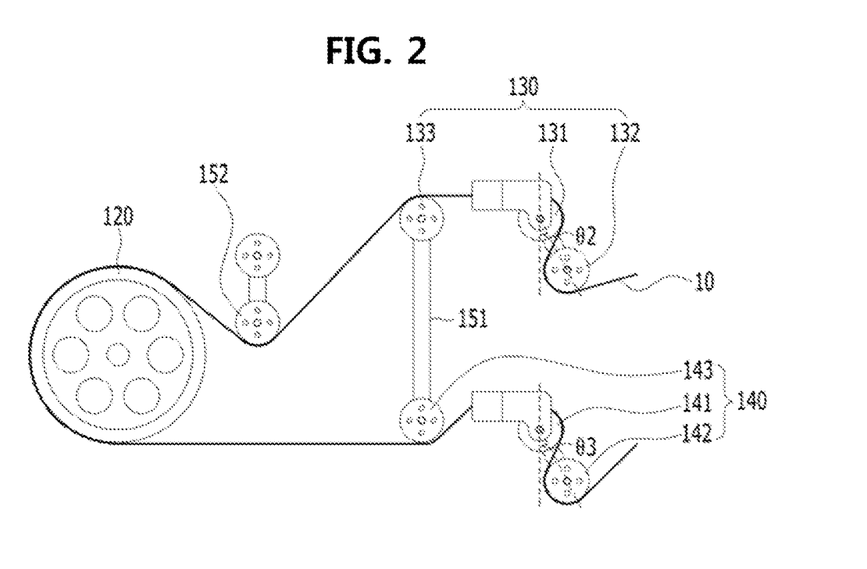
FIG. 2 is a side view of a main roller, a wire, a first pulley system, and a second pulley system according to an embodiment of the present invention.
Figure 3A:
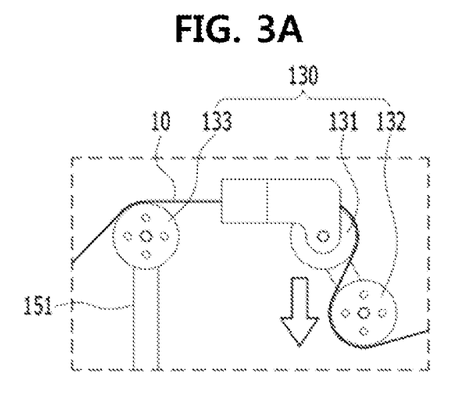
FIG. 3A and FIG. 3B are a side view of the first pulley system and the second pulley system according to the embodiment of the present invention.
Figure 3B:
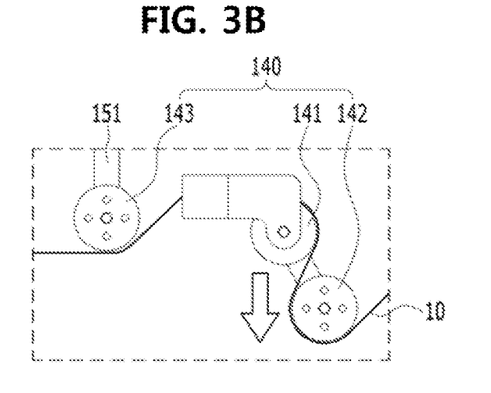
Figure 4:
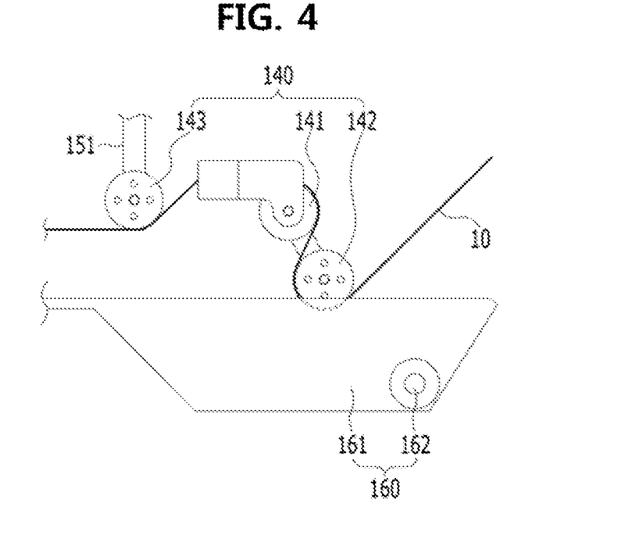
FIG. 4 is a side view of a dust collection unit according to an embodiment of the present invention.

FIG. 1 is a side view of a wire saw having a dust collector according to an embodiment of the present invention. FIG. 2 is a side view of a main roller, a wire, a first pulley system, and a second pulley system according to an embodiment of the present invention. FIG. 3A and FIG. 3B are a side view of the first pulley system and the second pulley system according to the embodiment of the present invention. FIG. 4 is a side view of a dust collection unit according to an embodiment of the present invention.

Referring to FIGS. 1 to 4, the wire saw 100 having the dust collector is an apparatus capable of removing foreign matter, such as dust, particulate matter, or water, present on the surface of a wire 10. The wire saw 100 having the dust collector may be open at one side thereof. The wire 10 may be introduced through the open one side of the wire saw, foreign matter present on the surface of the wire 10 is removed, and the clean wire 10 may be discharged through the one side of the wire saw. The wire 10 may be a cutting wire capable of cutting a hard structure. The wire 10 may be a flexible line extending long so as to cut a hard structure, such as concrete or rocks. For example, the wire 10 may be a diamond wire for cutting. However, the present invention is not limited thereto.

The wire saw 100 having the dust collector includes a protective frame 110, a main roller 120, a first pulley system 130, a second pulley system 140, a connection portion 151, a third support roller 152, a dust collection unit 160, and a lower inclined surface 170.

The protective frame 110 of the wire saw 100 having the dust collector is an element configured to enclose other elements of the wire saw 100 having the dust collector in order to protect the same. The protective frame 110 may have an inner space, and the main roller 120, the first pulley system 130, the second pulley system 140, the connection portion 151, the third support roller 152, the dust collection unit 160, and the lower inclined surface 170 may be disposed in the inner space of the protective frame 110. The protective frame 110 may have a closed structure capable of isolating the inside of the wire saw 100 having the dust collector from the outside. Specifically, the protective frame 110 may have a structure open at one side thereof, and the wire 10 may be introduced or discharged through the open one side of the protective frame. The remaining part of the protective frame 110 excluding the open one side thereof may have a closed structure configured to isolate the inner space of the protective frame 110 from the outside. Consequently, foreign matter, such as dust, present in the wire saw 100 having the dust collector may be prevented from being discharged to the outside.

The main roller 120 of the wire saw 100 having the dust collector may be a roller configured to be rotated by power. The main roller 120 may be connected to a motor configured to provide rotational force, and the main roller 120 may be rotated by the motor. The motor may be an internal motor included in the wire saw 100 having the dust collector. Alternatively, the motor may be disposed outside the wire saw 100 having the dust collector so as to be connected to the main roller 120. The main roller 120 may be rotated by power provided by the motor, and the wire 10 that contacts an outer circumferential surface of the main roller 120 may be moved around the outer circumferential surface of the main roller 120 by rotation of the main roller 120.

The first pulley system 130 of the wire saw 100 having the dust collector is an element capable of removing foreign matter present on the surface of the wire 10. The wire 10 is introduced into the wire saw 100 having the dust collector from the outside of the wire saw 100 having the dust collector through the open one side thereof, and may be moved to the main roller 120 via the first pulley system 130. The first pulley system 130 may remove foreign matter present on the surface of the wire 10 introduced into the wire saw 100 having the dust collector.

In the present invention, upper dust collection rollers and lower dust collection rollers may be referred to as rollers. Since these rollers have a function of separating foreign matter from the surface of the wire and collecting the foreign matter in the dust collection unit located below, however, the above rollers will be referred to as dust collection rollers for the sake of description.

Specifically, the first pulley system 130 includes a first upper dust collection roller 131, a first lower dust collection roller 132, and a first support roller 133. The first lower dust collection roller 132 may be disposed under the first upper dust collection roller 131. At this time, the first upper dust collection roller 131 and the first lower dust collection roller 132 may be disposed obliquely so as to be inclined relative to a direction perpendicular to the ground. The first lower dust collection roller 132 may be disposed closer to the open one side of the wire saw 100 having the dust collector than the first upper dust collection roller 131. As a result, a straight line that joins the first upper dust collection roller 131 and the first lower dust collection roller 132 to each other may form a second angle θ2 together with a straight line perpendicular to the ground, as shown in FIG. 2. The second angle θ2 may be greater than 0° and less than 90°.

The wire 10 may be staggered around the first upper dust collection roller 131 and the first lower dust collection roller 132. Specifically, the wire 10 introduced into the first pulley system 130 may pass around an outer circumferential surface of the first lower dust collection roller 132 first, may pass through a space between the first lower dust collection roller 132 and the first upper dust collection roller 131, and may pass around an outer circumferential surface of the first upper dust collection roller 131. Since the wire 10 passes between the first upper dust collection roller 131 and the first lower dust collection roller 132 in a staggered fashion, as described above, it is possible to effectively increase the area of contact with each of the first upper dust collection roller 131 and the first lower dust collection roller 132.

The wire 10 that has passed around the first upper dust collection roller 131 may pass around an outer circumferential surface of the first support roller 133. The first support roller 133 may serve to support the wire 10 such that the wire 10 can stably reach the main roller 120.

The first support roller 133 may be connected to a second support roller 143 of the second pulley system 140 via the connection portion 151. The connection portion 151 may be an element configured to connect the first support roller 133 and the second support roller 143 to each other such that the first support roller 133 and the second support roller 143 can be more stably fixed.

Referring to FIG. 3A, the first pulley system 130 may remove foreign matter present on the surface of the wire 10 in an arrow direction of FIG. 3A. Specifically, the wire 10 may pass around the first upper dust collection roller 131 and the first lower dust collection roller 132, and centrifugal force generated on the outer circumferential surface of each of the first upper dust collection roller 131 and the first lower dust collection roller 132 due to rotation thereof may be applied to the wire 10. Foreign matter, such as dust or water, present on the surface of the wire 10 may be separated by the centrifugal force generated by rotation of the dust collection rollers in a direction tangential to the outer circumferential surface of the first upper dust collection roller 131 and in a direction tangential to the outer circumferential surface of the first lower dust collection roller 132. The separated foreign matter may fall to the ground due to gravity.

The wire 10 that has passed through the first pulley system 130 may come into contact with an outer circumferential surface of the third support roller 152, and may then be moved to the main roller 120. The third support roller 152 may be a roller that serves to support the wire 10 so as to be stably movable between the first pulley system 130 and the main roller 120.

The wire that has passed around the third support roller 152 may pass around the main roller 120. As previously described, power provided by the main roller 120 may be applied to the wire 10 that contacts the outer circumferential surface of the main roller 120, and the wire 10 may be moved around the outer circumferential surface of the main roller while being pushed.

The second pulley system 140 of the wire saw 100 having the dust collector is an element capable of removing foreign matter present on the surface of the wire 10. The wire 10 that has passed around the main roller 120 may be moved to the second pulley system 140. The second pulley system 140 may remove foreign matter present on the surface of the wire 10. The second pulley system 140 may be disposed under the first pulley system 130.

The second pulley system 140 includes a second upper dust collection roller 141, a second lower dust collection roller 142, and a second support roller 143. The wire 10 that has passed around the main roller 120 may pass around an outer circumferential surface of the second support roller 143. The second support roller 143 may serve to support the wire 10 such that the wire 10 can be stably moved from the main roller 120 to the second upper dust collection roller 141.

The second lower dust collection roller 142 may be disposed under the second upper dust collection roller 141. At this time, the second upper dust collection roller 141 and the second lower dust collection roller 142 may be disposed obliquely so as to be inclined relative to a direction perpendicular to the ground. The second lower dust collection roller 142 may be disposed closer to the open one side of the wire saw 100 having the dust collector than the second upper dust collection roller 141. As a result, a straight line that joins the second upper dust collection roller 141 and the second lower dust collection roller 142 to each other may form a third angle θ3 together with a straight line perpendicular to the ground, as shown in FIG. 2. The third angle θ3 may be greater than 0° and less than 90°. At this time, the third angle θ3 may be equal to the second angle θ2. That is, the degree of inclination between the second upper dust collection roller 141 and the second lower dust collection roller 142 may be equal to the degree of inclination between the first upper dust collection roller 131 and the first lower dust collection roller 132.

The wire 10 may be staggered around the second upper dust collection roller 141 and the second lower dust collection roller 142. Specifically, the wire 10 introduced into the second pulley system 140 may pass around an outer circumferential surface of the second upper dust collection roller 141 first, may pass through a space between the second upper dust collection roller 141 and the second lower dust collection roller 142, and may pass around an outer circumferential surface of the second lower dust collection roller 142. Since the wire 10 passes between the second upper dust collection roller 141 and the second lower dust collection roller 142 in a staggered fashion, as described above, it is possible to effectively increase the area of contact with each of the second upper dust collection roller 141 and the second lower dust collection roller 142.

Referring to FIG. 3B, the second pulley system 140 may remove foreign matter present on the surface of the wire 10 in an arrow direction of FIG. 3B. Specifically, the wire 10 may pass around the second upper dust collection roller 141 and the second lower dust collection roller 142, and centrifugal force generated on the outer circumferential surface of each of the second upper dust collection roller 141 and the second lower dust collection roller 142 due to rotation thereof may be applied to the wire 10. Foreign matter, such as dust or water, present on the surface of the wire 10 may be separated by the centrifugal force generated by rotation of the dust collection rollers in a direction tangential to the outer circumferential surface of the second upper dust collection roller 141 and in a direction tangential to the outer circumferential surface of the second lower dust collection roller 122. The separated foreign matter may fall to the ground due to gravity.

Foreign matter may be primarily removed from the wire 10 while the wire passes through the first pulley system 130, and foreign matter may be secondarily removed from the wire 10 while the wire passes through the second pulley system 140.

In the above description, the wire saw 100 having the dust collector according to the embodiment of the present invention includes both the first pulley system 130 and the second pulley system 140. However, the present invention is not limited thereto. The wire saw 100 having the dust collector may include only the first pulley system 130 or may include only the second pulley system 140. That is, the wire saw 100 having the dust collector may include only one pulley system.

Referring to FIG. 4, the foreign matter removed by the first pulley system 130 and the second pulley system 140 may be collected in the dust collection unit 160. The dust collection unit 160 of the wire saw 100 having the dust collector is an element configured to collect the foreign matter removed from the surface of the wire 10 and to discharge the collected foreign matter from the wire saw 100 having the dust collector.

The dust collection unit 160 includes a collection portion 161 and a discharge port 162. The collection portion 161 of the dust collection unit 160 is an element configured to collect the foreign matter removed from the wire 10 by the first pulley system 130 and the second pulley system 140. The collection portion 161 may be disposed under the first pulley system 130 and the second pulley system 140 so as to overlap both the first pulley system 130 and the second pulley system 140. The collection portion 161 may be formed in a structure concave at an upper part thereof having a space configured to allow foreign matter to be stably collected therein. Foreign matter that falls from the first pulley system 130 and the second pulley system 140 in a direction toward the ground may be received in the collection portion 161.

The discharge port 162 of the dust collection unit 160 may be an opening formed in a portion of the collection portion 161. That is, the discharge port 162 may be a passage that connects the collection portion 161 to the outside. Although not shown in FIG. 1, a dust collector may be further disposed in the discharge port 162. The dust collector may be an element configured to apply suction force necessary to suction foreign matter. The dust collector may be installed in the discharge port 162, and the foreign matter collected in the collection portion 161 may be suctioned by the suction force of the dust collector so as to be discharged to the outside through the discharge port 162. Consequently, the foreign matter collected in the collection portion 161 may be discharged to the outside through the discharge port 162.

The lower inclined surface 170 of the wire saw 100 having the dust collector may be an inner lower surface of the wire saw 100 having the dust collector inclined such that foreign matter separated from the wire on the main roller 120 is movable to the dust collection unit 160. A lower surface of an inner space of the wire saw 100 having the dust collector may be inclined by a first angle θ1 by the lower inclined surface 170. The portion of the lower inclined surface 170 adjacent to the main roller 120 may be located high, and the height of the lower inclined surface may be gradually decreased from the main roller 120 to the dust collection unit 160. Since the lower inclined surface 170 is inclined by the first angle θ1, as described above, foreign matter falling to the lower inclined surface 170 may be effectively moved to the dust collection unit 160 along the lower inclined surface.

The wire saw 100 having the dust collector according to the embodiment of the present invention includes the pulley systems 130 and 140 respectively including the upper dust collection rollers 131 and 141, the lower dust collection rollers 132 and 142, and the support rollers 133 and 143, whereby it is possible to effectively remove foreign matter, such as dust or water, from the surface of the wire 10. Centrifugal force generated on the outer circumferential surface of each of the dust collection rollers 131, 141, 132, and 142 due to rotation thereof may be applied to the wire 10 that passes around the upper dust collection rollers 131 and 141 and the lower dust collection rollers 132 and 142 in a staggered fashion. Consequently, the foreign matter attached to the surface of the wire 10 may be removed by the centrifugal force generated by rotation of the dust collection rollers in a direction tangential to the outer circumferential surface of each of the dust collection rollers. The removed foreign matter may fall to the ground due to gravity and may be collected in the dust collection unit 160. The collected foreign matter may be discharged to the outside through the discharge port 162. Since the wire saw 100 having the dust collector according to the embodiment of the present invention uses the centrifugal force of the dust collection rollers 131, 141, 132, and 142, it is possible to more rapidly and safety remove foreign matter from the wire 10. In addition, only energy used to rotate the rollers is consumed in order to remove foreign matter, and therefore it is possible to remove foreign matter from the wire 10 using an environmentally friendly method that is effective in saving energy.

In a wire saw having a dust collector according to another embodiment of the present invention, a first pulley system and a second pulley system may be disposed so as to deviate from each other such that the first pulley system and the second pulley system do not overlap each other when viewed from above. Unlike the first pulley system 130 and the second pulley system 140 disposed so as to vertically overlap each other, as shown in FIG. 1, the first pulley system and the second pulley system of the wire saw having the dust collector according to the other embodiment of the present invention may be disposed so as to deviate from each other. For example, the first pulley system may be disposed closer to an open part of the wire saw having the dust collector than the second pulley system. Alternatively, the second pulley system may be disposed closer to the open part of the wire saw having the dust collector than the first pulley system. Since the first pulley system and the second pulley system are disposed so as to deviate from each other such that the first pulley system and the second pulley system do not overlap each other when viewed from above, as described above, it is possible to reduce the amount of foreign matter removed by the first pulley system that is introduced into the second pulley system. That is, the second pulley system may not be disposed under the first pulley system immediately in a direction perpendicular to the ground, and foreign matter falling vertically due to gravity in the first pulley system may directly fall to a dust collection unit 160 without being introduced into the second pulley system. Consequently, the wire saw having the dust collector is capable of more effectively removing foreign matter from the surface of a wire 10.

In the wire saw having the dust collector according to the other embodiment of the present invention, a second angle of the first pulley system may be greater than a third angle of the second pulley system. Specifically, a first upper dust collection roller and a first lower dust collection roller of the first pulley system may be disposed inclined at the second angle relative to a straight line perpendicular to the ground. In addition, a second upper dust collection roller and a second lower dust collection roller of the second pulley system may be disposed inclined at the third angle relative to a straight line perpendicular to the ground. At this time, unlike that the second angle θ2 and the third angle θ3 are equal to each other in the wire saw 100 having the dust collector of FIGS. 1 to 4, the wire saw having the dust collector according to the other embodiment of the present invention may be configured such that the second angle and the third angle are different from each other, for example the second angle is greater than the third angle. At this time, it may be preferable for each of the second angle and the third angle to be between 10 degrees and 30 degrees. Consequently, the inclination between the first upper dust collection roller and the first lower dust collection roller may be gentler relative to the ground than the inclination between the second upper dust collection roller and the second lower dust collection roller. In this case, when viewed from above, the area occupied by the first pulley system may be greater than the area occupied by the second pulley system. As a result, all foreign matter removed from the wire 10 by the first pulley system may not be introduced into the second pulley system, and therefore it is possible for the second pulley system to more effectively remove foreign matter from the wire 10.

Figure 5:
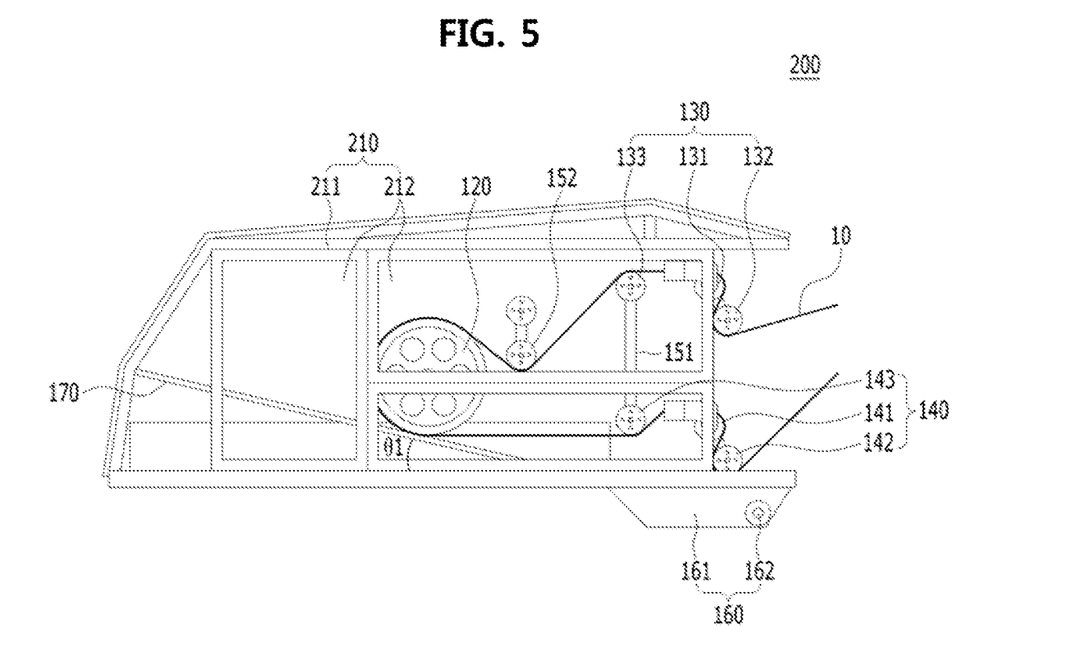
FIG. 5 is a side view of a wire saw having a dust collector according to another embodiment of the present invention.

FIG. 5 is a side view of a wire saw having a dust collector according to another embodiment of the present invention. The wire saw 200 having the dust collector of FIG. 5 is substantially identical to the wire saw 100 having the dust collector of FIGS. 1 to 4 except that a protective frame 210 is different, and therefore a duplicate description will be omitted. For the sake of description, a description will be given with reference to FIGS. 1 to 4.

Referring to FIG. 5, the protective frame 210 of the wire saw 200 having the dust collector includes a support frame 211 and a transparent window 212. The support frame 211 is an element that forms the external framework of the protective frame 210. The support frame 211 may include a plurality of openings configured to connect an inner space of the wire saw 200 having the dust collector to the outside.

The transparent window 212 may be formed in each of the plurality of openings of the support frame 211 so as to isolate the inner space of the wire saw 200 having the dust collector from the outside. The transparent window 212 may be made of a transparent material, such as transparent acrylic or transparent glass. In the wire saw 200 having the dust collector, therefore, the interior of the wire saw 200 having the dust collector may be visible through the transparent window 212. Consequently, it is possible for a user of the wire saw 200 having the dust collector to check removal of foreign matter from a wire 10 in the wire saw 200 having the dust collector with the naked eye.

Referring to FIG. 5, the wire saw 200 may further include a nozzle. The nozzle may be configured to inject water or liquid toward the main roller 120 (in a perpendicular direction) or may be configured to inject water or liquid toward a path before the wire reaches the first support roller 133 from the first lower dust collection roller 132 via the first upper dust collection roller 131 in the first pulley system (in the perpendicular direction). As an example, the nozzle may be attached to a frame configured to support a third support roller 152 so as to inject water or liquid toward the main roller 120 in the perpendicular direction, may be attached to the support frame 211 so as to inject water or liquid toward the main roller 120 in the perpendicular direction, or may be attached to the protective frame 210 so as to inject water or liquid toward the main roller 120 in the perpendicular direction.

Although foreign matter is removed from the wire while the wire is twisted by the first upper dust collection roller of the first pulley system and the second lower dust collection roller of the second pulley system, the wire saw 200 further includes the nozzle in order to more finely and accurately remove the foreign matter. Water or liquid from the nozzle may be injected to the main roller 120 in the perpendicular direction, whereby it is possible to finely remove foreign matter from the wire 10 passing around the main roller 120.

All wire saws having dust collectors according to the present invention may each include the nozzle as described above.

Figure 6:
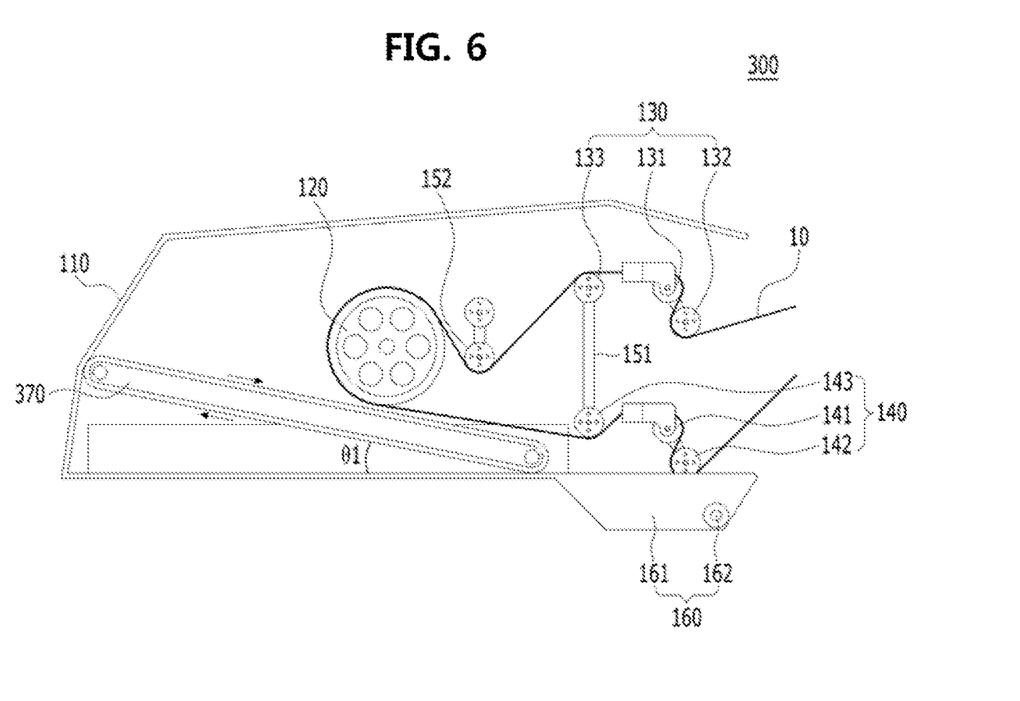
FIG. 6 is a side view of a wire saw having a dust collector according to another embodiment of the present invention.

FIG. 6 is a side view of a wire saw having a dust collector according to another embodiment of the present invention. The wire saw 300 having the dust collector of FIG. 6 is substantially identical to the wire saw 100 having the dust collector of FIGS. 1 to 4 except that a lower inclined surface 370 is different, and therefore a duplicate description will be omitted. For the sake of description, a description will be given with reference to FIGS. 1 to 4.

Referring to FIG. 6, the lower inclined surface 370 may be constituted by a conveyor belt. Specifically, the lower inclined surface 370 may include a plurality of rollers and a belt disposed along outer circumferential surfaces of the plurality of rollers while wrapping the plurality of rollers. The plurality of rollers of the lower inclined surface 370 may be rotated by power provided from the inside or the outside of the wire saw 300 having the dust collector, and an upper surface of the belt may be moved by rotation of the plurality of rollers. As previously described, the lower inclined surface 370 may be inclined by a first angle θ1, and the belt of the lower inclined surface 370 may be moved from the portion thereof adjacent to a main roller 120 to a dust collection unit 160 while sliding. Consequently, foreign matter falling to the lower inclined surface 370 may be more effectively moved to the dust collection unit 160 while sliding along the belt that is moving.

Figure 7:
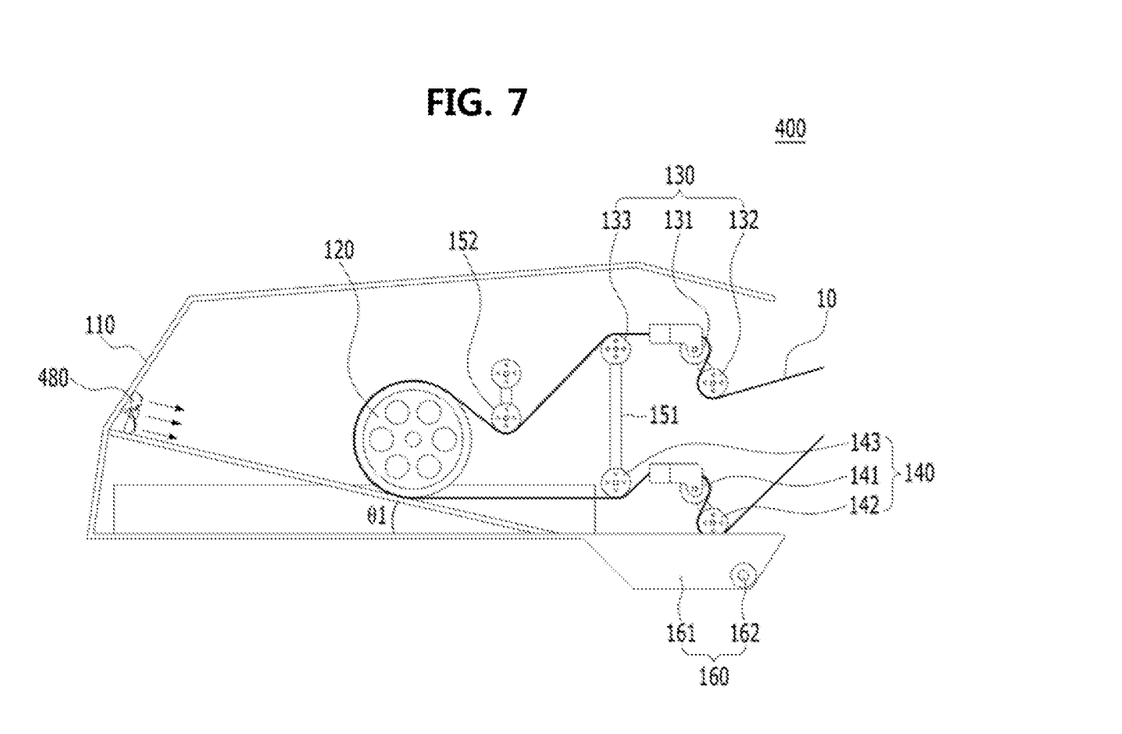
FIG. 7 is a side view of a wire saw having a dust collector according to a further embodiment of the present invention.

FIG. 7 is a side view of a wire saw having a dust collector according to a further embodiment of the present invention.

The wire saw 400 having the dust collector of FIG. 7 is substantially identical to the wire saw 100 having the dust collector of FIGS. 1 to 4 except that an air circulation unit 480 is further included, and therefore a duplicate description will be omitted. For the sake of description, a description will be given with reference to FIGS. 1 to 4.

Referring to FIG. 7, the air circulation unit 480 of the wire saw 400 having the dust collector is configured to generate the flow of air from an inner space of the wire saw 400 having the dust collector to a dust collection unit 160. As shown in FIG. 7, the air circulation unit 480 may be configured in the form of a fan. Air generated by the air circulation unit 480 may flow to the dust collection unit 160 along the surface of a lower inclined surface 170. Consequently, foreign matter, such as dust, falling to the lower inclined surface 170 may be more easily moved to the dust collection unit 160 along with the flow of air generated by air circulation unit 480. Specifically, the lower inclined surface 170 of the wire saw 400 having the dust collector may be inclined obliquely, whereby foreign matter may be moved to the dust collection unit 160 along the lower inclined surface, and the movement of the foreign matter may be more rapidly and effectively performed by the flow of air generated by air circulation unit 480. In addition, foreign matter that does not run down along the lower inclined surface, i.e. foreign matter remaining on the lower inclined surface, may be moved by the flow of air, whereby it is possible to remedy a situation in which the foreign matter does not run down and thus remains in place.

Wire saws having dust collectors according to various embodiments of the present invention may each include a main roller configured to provide power and a pulley system including a plurality of rollers, wherein a wire is connected to the main roller and the plurality of rollers of the pulley system, and the pulley system is capable of separating foreign matter from the wire using the plurality of rollers.

According to another feature of the present invention, the pulley system may include a support roller, an upper dust collection roller, and a lower dust collection roller, to which the wire is sequentially connected, and the wire may be connected to the upper dust collection roller and the lower dust collection roller in a staggered fashion.

According to another feature of the present invention, the upper dust collection roller and the lower dust collection roller may be disposed so as to be inclined relative to the ground.

According to another feature of the present invention, the pulley system may include a first pulley system and a second pulley system disposed vertically.

According to another feature of the present invention, the wire saw having the dust collector may further include a dust collection unit disposed under the pulley system so as to receive foreign matter separated by the pulley system, and the dust collection unit may include a collection portion configured to collect foreign matter and a discharge port configured to discharge the foreign matter to the outside.

According to another feature of the present invention, the wire saw having the dust collector may further include a lower inclined surface disposed under the main roller.

According to a further feature of the present invention, the wire saw having the dust collector may further include a protective frame including a transparent window.

Wire saws having dust collectors according to various embodiments of the present invention may each include a main roller configured to provide power and a pulley system including a plurality of rollers, wherein a cutting wire is connected to the main roller and the plurality of rollers of the pulley system, and the pulley system is capable of separating foreign matter from the cutting wire using centrifugal force generated by the plurality of rollers.

The elements described above are denoted by the following reference symbols.

10: wire, 100, 200, 300, 400: wire saws having dust collectors, 110, 210: protective frames, 211: support frame, 212: transparent window, 120: main roller, 130: first pulley system, 131: first upper dust collection roller, 132: first lower dust collection roller, 133: first support roller, 140: second pulley system, 141: second upper dust collection roller, 142: second lower dust collection roller, 143: second support roller, 151: connection portion, 152: third support roller, 160: dust collection unit, 161: collection portion, 162: discharge port, 170, 370: lower inclined surfaces, 480: air circulation unit, θ1: first angle, θ2: second angle, θ3: third angle, and 175: nozzle.

As is apparent from the above description, a wire saw having a dust collector according to the present invention has an advantage in that a (cutting) wire is moved around outer circumferential surfaces of a plurality of rollers, and foreign matter, such as dust or water, present on the surface of the wire is safely and environmentally friendlily removed by centrifugal force generated on the outer circumferential surface of each of the rollers.

Embodiments of the wire saw having the dust collector according to the present invention described above are merely illustrative, and it is obvious to those skilled in the art to which the present invention pertains that the present invention can be easily implemented in other concrete forms without changing the technical concept and essential features of the present invention.

The embodiments as described above are combinations of elements and features of the present invention. The elements or features may be considered selective unless mentioned otherwise. Each element or feature may be practiced without being combined with other elements or features. In addition, an embodiment of the present invention may be constructed by combining some of the elements and/or features. Operation orders described in the embodiments of the present invention may be changed. Some elements or features of any one embodiment may be included in another embodiment or may be replaced with corresponding elements or features of another embodiment. It is obvious to those skilled in the art that claims that are not explicitly cited in each other in the appended claims may be presented in combination as an embodiment of the present invention or included as a new claim by subsequent amendment after the application is filed.

It will be apparent to those skilled in the art that the present invention may be embodied in specific forms other than those set forth herein without departing from the spirit and essential characteristics of the present invention. Therefore, the above detailed description should be construed in all aspects as illustrative and not restrictive. The scope of the present invention should be determined by reasonable interpretation of the accompanying claims, and all modifications within an equivalent scope of the present invention are included in the scope of the present invention.

INDUSTRIAL APPLICABILITY

A wire saw having a dust collector according to the present invention is industrially applicable to cutting during road construction, dismantling of a structure, such as concrete, etc.

The invention claimed is:

1. A wire saw machine having a dust collector, the wire saw machine comprising:
   a main roller configured to move a wire through rotation thereof;
   a first pulley system comprising a first upper dust collection roller, a first lower dust collection roller, and a first support roller, the first pulley system being configured to separate foreign matter from the wire by generating centrifugal forces on respective outer circumferential surfaces of each of the first upper dust collection roller and first lower dust collection roller;
   a second pulley system comprising a second upper dust collection roller, a second lower dust collection roller, and a second support roller, the second pulley system being configured to separate foreign matter from the wire by generating centrifugal forces on respective outer circumferential surfaces of each of the second upper dust collection roller and second lower dust collection roller; and
   a dust collection unit provided under both the first pulley system and the second pulley system, the dust collection unit being configured to collect foreign matter separated from the first pulley system and the second pulley system, wherein
   the main roller is connected to the wire such that the main roller moves the wire to pass through the first lower dust collection roller, the first upper dust collection roller, and the first support roller of the first pulley system, subsequently pass through the main roller, and then pass through the second support roller, second upper dust collection roller, and second lower dust collection roller of the second pulley system,
   in the first pulley system, the first upper dust collection roller is disposed higher than and distanced from the first lower dust collection roller such that the first upper dust collection roller and the first lower dust collection roller are disposed so as to be inclined relative to a plane perpendicular to a ground,
   the second pulley system is disposed lower than the first pulley system, and
   the second upper dust collection roller is disposed higher than and distanced from the second lower dust collection roller such that the second upper dust collection roller and the second lower dust collection roller are disposed so as to be inclined relative to the plane perpendicular to the ground.

2. The wire saw machine according to claim 1, further comprising:
   a lower inclined surface disposed under the main roller, wherein the lower inclined surface is connected to the dust collection unit.

3. The wire saw machine according to claim 1, wherein an angle between an inclined axis formed by the first upper dust collection roller being disposed higher than and distanced from the first lower dust collection roller and the plane perpendicular to the ground is 10 degrees to 30 degrees.

4. The wire saw machine according to claim 1, wherein the dust collection unit comprises:
   a collection portion configured to collect the foreign matter; and
   a discharge port configured to discharge the foreign matter.

5. The wire saw machine according to claim 1, further comprising:
   a protective frame configured to protect an interior of the wire saw, wherein the protective frame comprises a transparent window.

6. The wire saw machine according to claim 1, further comprising:
   a third support roller disposed between the first pulley system and the main roller, the third support roller being configured to support the wire so as to be movable from the first pulley system to the main roller.

* * * * *